(12) United States Patent
Mönig et al.

(10) Patent No.: US 8,281,627 B2
(45) Date of Patent: Oct. 9, 2012

(54) DEVICE FOR ACTUATING A LOCKING MEMBER

(75) Inventors: Stefan Mönig, Schwelm (DE); Mirko Schindler, Velbert (DE); Matthias Klein, Dachau (DE); Jörg Simon, Wülfrath (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 2 days.

(21) Appl. No.: 13/003,533

(22) PCT Filed: Jul. 10, 2009

(86) PCT No.: PCT/EP2009/058869
§ 371 (c)(1),
(2), (4) Date: Jan. 10, 2011

(87) PCT Pub. No.: WO2010/004046
PCT Pub. Date: Jan. 14, 2010

(65) Prior Publication Data
US 2011/0120198 A1 May 26, 2011

(30) Foreign Application Priority Data
Jul. 11, 2008 (DE) .......................... 10 2008 032 585

(51) Int. Cl.
*E05B 9/10* (2006.01)
*E05B 17/04* (2006.01)
(52) U.S. Cl. ............ 70/379 R; 70/182; 70/183; 70/184; 70/185; 70/186; 70/252; 70/380
(58) Field of Classification Search .................... 70/252, 70/182–186, 379 R, 380
See application file for complete search history.

(56) References Cited

U.S. PATENT DOCUMENTS
6,382,003 B1 * 5/2002 Watanuki et al. ............... 70/252
(Continued)

FOREIGN PATENT DOCUMENTS
DE 103 44 415 A1 4/2004
(Continued)

OTHER PUBLICATIONS
International Search Report dated Oct. 12, 2009 to corresponding International Application No. PCT/EP2009/058869, 4 pages.
(Continued)

*Primary Examiner* — Suzanne Barrett
*Assistant Examiner* — David E Sosnowski
(74) *Attorney, Agent, or Firm* — Maier & Maier PLLC

(57) ABSTRACT

The invention relates to a device for actuating a locking member (10) of a functionally essential component (40), particularly a steering column (40) of a motor vehicle, having a gear box (20), being operatively connected to the locking member (10), wherein the locking member (10) can be moved into a locked position (1) and into a released position (2), and vice versa, wherein the locking member (10) engages into the functionally essential component (40) in the locked position (1), the locking member (10) is released from the functionally essential component (40) in the released position (2), an actuation device (30) is provided that can be accessed by a user, said actuation device being signal-connected to the gear box (20) during normal operation, by means of which an electronic actuation of the gear box (20) can be effected via an intentional actuation of the actuation device (30), said gear box moving the locking member (10) into the respective position (1, 2) thereof.
The invention provides that the actuation device (30) is mechanically decoupled from the gear box (20) during normal operation, and that the actuation device (30) can be mechanically coupled to the gear box (20) during emergency operation such that a movement of the locking member (10) into the respective position (1, 2) thereof, is carried out via manual actuation of the actuation device (30).

15 Claims, 5 Drawing Sheets

U.S. PATENT DOCUMENTS

Figure 3:
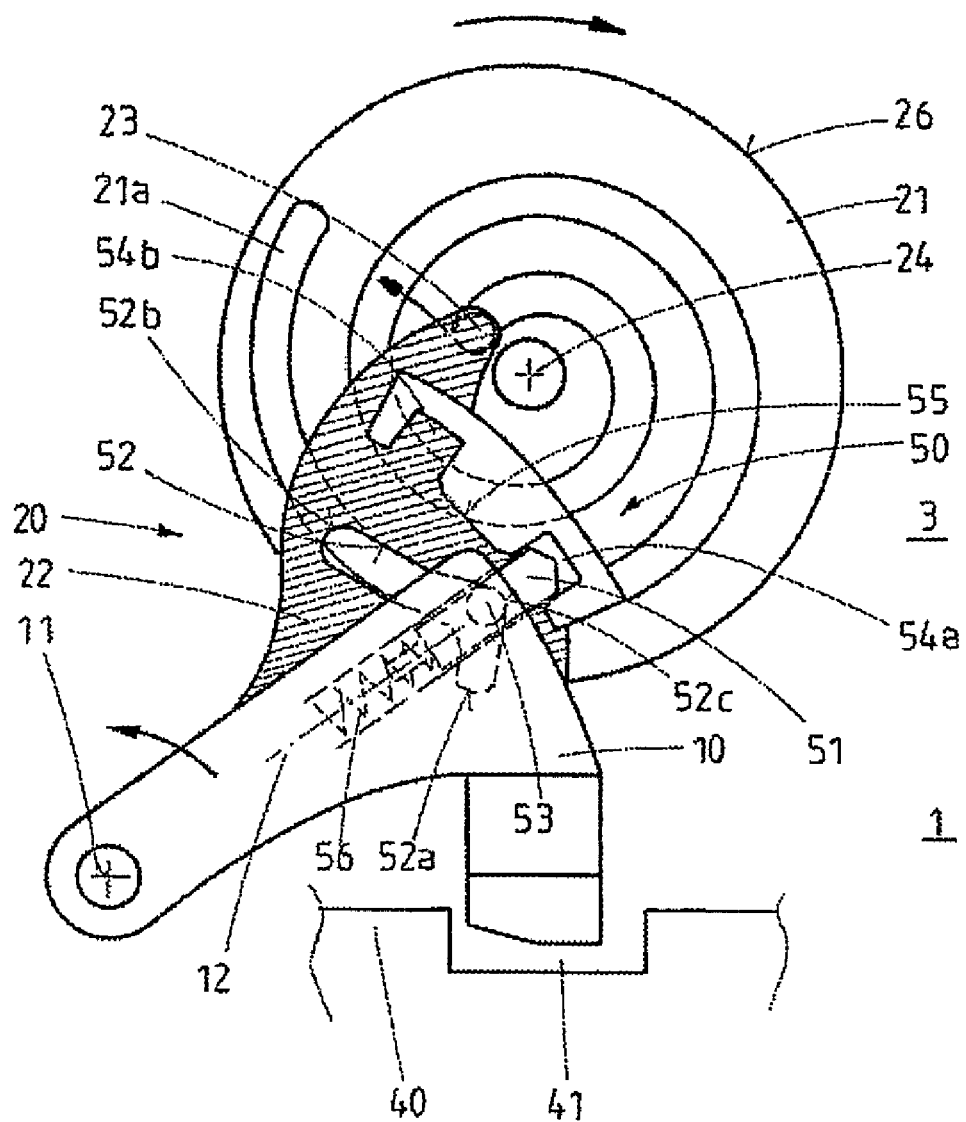

| | | | |
|---|---|---|---|
| 6,442,985 B1 * | 9/2002 | Watanuki et al. | 70/186 |
| 6,786,069 B2 * | 9/2004 | Ochi | 70/252 |
| 6,826,934 B2 * | 12/2004 | Canard | 70/186 |
| 7,007,525 B2 * | 3/2006 | Okuno et al. | 70/186 |
| 7,042,343 B2 | 5/2006 | Konno et al. | |
| 7,290,416 B2 * | 11/2007 | Ohtaki et al. | 70/252 |
| 7,299,669 B1 * | 11/2007 | Chung et al. | 70/252 |
| 2004/0069027 A1 | 4/2004 | Fukushima | |
| 2006/0070414 A1 * | 4/2006 | Limburg et al. | 70/186 |
| 2006/0169011 A1 * | 8/2006 | Limburg | 70/186 |

FOREIGN PATENT DOCUMENTS

| | | |
|---|---|---|
| DE | 103 56 660 A1 | 7/2005 |
| EP | 1 504 972 A | 2/2005 |
| EP | 18 92 506 A1 | 2/2008 |
| WO | 2008/002096 A | 1/2008 |

OTHER PUBLICATIONS

German Search Report issued Oct. 22, 2009 to corresponding German Patent Application No. 10 2008 032 585.6, 4 pages.

* cited by examiner

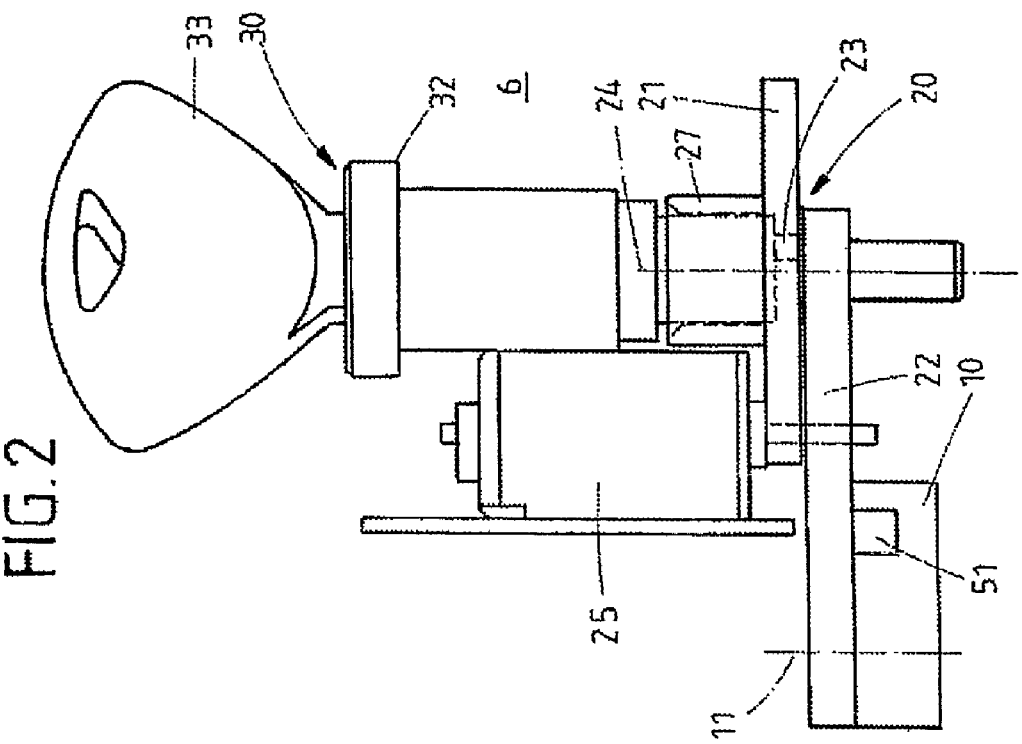
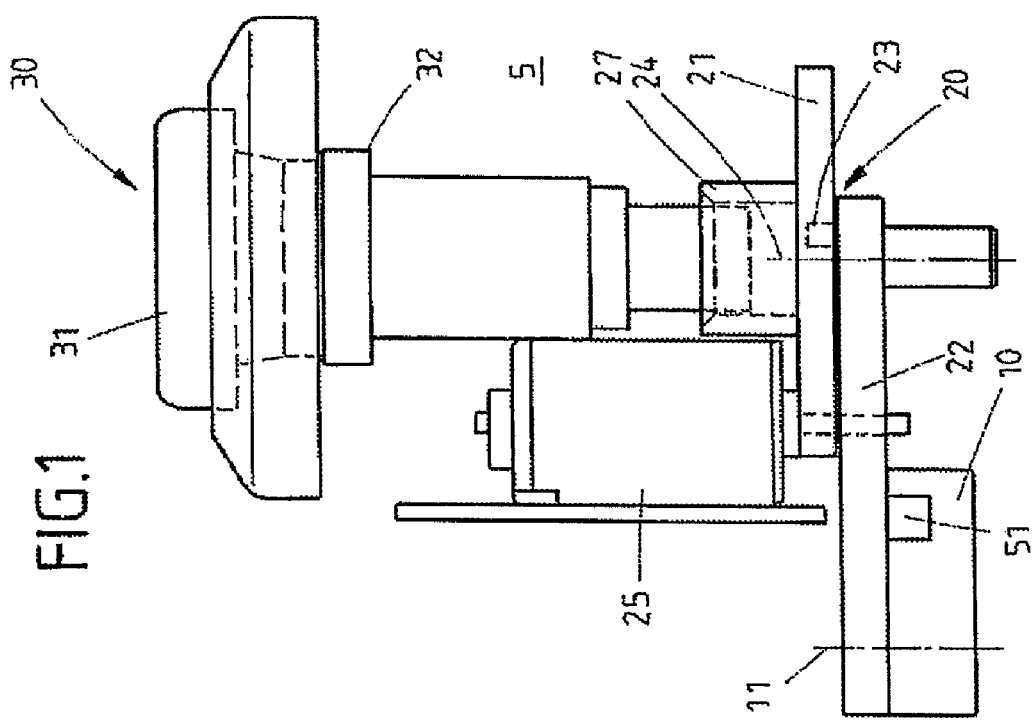

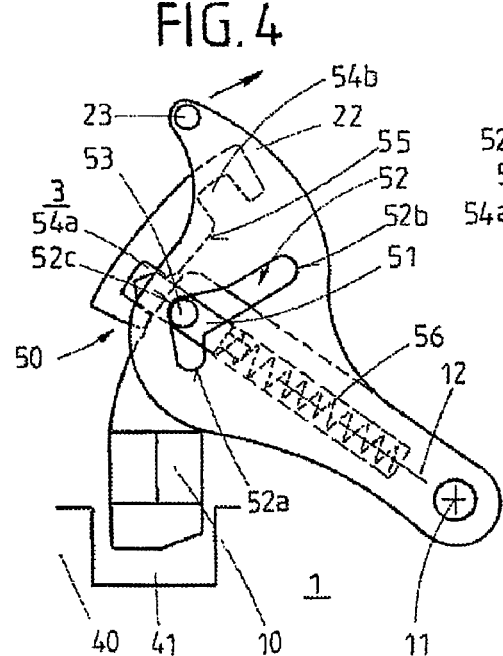
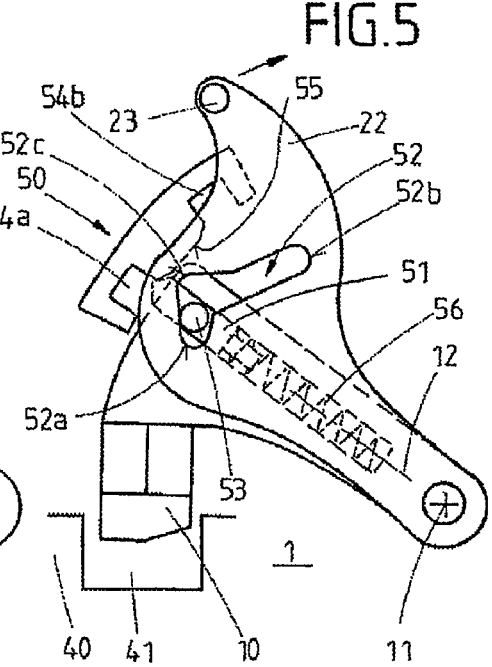
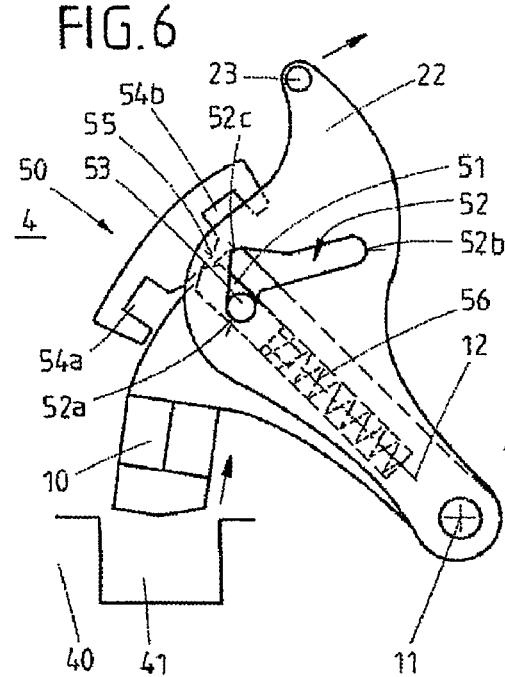
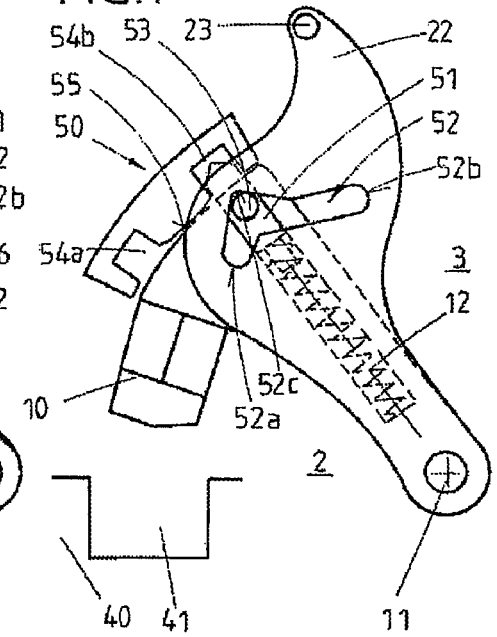

DEVICE FOR ACTUATING A LOCKING MEMBER

RELATED APPLICATIONS

This application claims priority, under 35 U.S.C. §119, to International Application No. PCT/EP2009/058869, filed Jul. 10, 2009 which claims the benefit of German Patent Application No.: DE 10 2008 032 585.6, filed on Jul. 11, 2008, the disclosures of which are incorporated by reference herein in its entirety.

The invention relates to a device for actuating a locking member of a functionally essential component, particularly a steering column of a motor vehicle, having a gear box, being operatively connected to the locking member, wherein the locking member can be moved into a locked position and into a released position, and vice versa, wherein the locking member engages into the functionally essential component in the locked position, the locking member is released from the functionally essential component in the released position, an actuation device is provided that can be accessed by a user, said actuation device being signal-connected to the gear box during normal operation, by means of which an electronic actuation of the gear box can be effected via an intentional activation of the actuation device, said gear box moving the locking member into its respective position.

DE 10 2006 017 875 discloses a device to control a locking member of a steering column of a motor vehicle, wherein a locking member is provided, which can be moved into two positions via a control element. On the one hand, the locking member can assume a locked position, in which it protrudes through an opening in the device and thus remains in an effective connection with the steering column. The steering column is blocked in this position of the locking member, so that the user of the motor vehicle cannot move the steering unit, particularly the steering wheel, handlebars, etc. On the other hand, the locking member can assume a released position, in which it is mostly aligned within the device and disengaged from the steering column. In addition, a securing element is provided, so that the locking member can at least be arrested in the released position.

Such locking devices are activated e.g. by the user via an actuation unit, which is permanently attached to the motor vehicle. The actuation unit maintains a signal connection with the gear box, by which an electronic control of the gear box is attained via an intentional activation of the actuation unit, and the locking member, in turn, brings the gear box into its respective locked or released position. Should, in case of an emergency, no power supply be present, it is impossible for the user to trigger a corresponding movement of the locking member in its respective position via the actuation unit.

It is the objective of the subject invention to create a device for controlling the locking member, which device will avoid the disadvantages in question, and which, in spite of any possible electronic defects or failures, always provides the user with the option of triggering the movement of the locking member in a simple manner.

In order to fulfill this objective, a device with the characteristics of claim 1 is being presented. The dependent claims describe preferred embodiments.

In the spirit of the invention, it is provided that the actuation unit is uncoupled from the gear box during normal operation and the actuation unit can be mechanically coupled with the gear box during emergency operation in such a manner, that a movement of the locking member into its respective position is carried out via a manual activation of the actuation unit.

According to the invention, the actuation unit is mechanically disengaged from the gear box during normal operation, so that a signal is triggered upon the activation of the actuation unit, by which a corresponding electronic control of the gear box is attained, which moves the locking member into a desired position. In the instance that during emergency operation no power supply can be furnished to the patent-relevant device, a purely manual movement of the gear box is feasible for the user. To this end, it is provided that during such an emergency operation, the actuation unit can be mechanically coupled to the gear box, so that for instance the actuation unit and the gear box are form-fitting. The user is able to generate certain motion on the gear box through the actuation unit, which in turn triggers a corresponding movement of the locking member into its respective position.

In a prospective embodiment, the actuation unit features an actuation element as well as a receptor body, into which an emergency key can be inserted during emergency operation. The emergency key can for example be located in an ID-generator, which is carried by the user. It is preferable that the actuation unit is movably situated within the housing of the invention-relevant device. The emergency key is slipped into the actuation element during emergency operation. The application of corresponding pressure onto the key produces a movement of the actuation unit towards the gear box until the actuation unit is form-fitting with the gear box. A turn of the actuation unit, which for example can be engineered as a key cylinder, produces an actuation of the gear box, which results in a motion transfer to the locking member, which in turn moves into its respective position.

It is practical that the actuation unit is able to move between a rest position and an active position within the housing of the patent-relevant device, wherein the actuation unit is situated disengaged from the gear box in the rest position, and the actuation unit finds itself in an operative connection with the gear box in the actuation position.

It is advantageous that the actuation element of the actuation unit is equipped with an proximity sensor or a touch sensor. An additional embodiment can feature the actuation element shielding the receptor body during the normal operation. It means that the receptor body, into which the emergency key can be inserted, is not visible to the user. During emergency operation the actuation element, which can be arranged as a cap on the receptor body, can be swung away, moved away, etc. from the receptor body. For example, the actuation element can be situated on the receptor body on a joint. As an alternative, the actuation element can be screwed with a thread on the actuation unit.

In an additional preferable embodiment, the actuation element features a display medium, which serves to show the information to the user. It is conceivable that the actuation element can also serve to start the engine of the motor vehicle. That means that the actuation element serves as the sole component for unlocking and locking the motor vehicle as well as for starting the engine. Via the display medium, the user can be advised that for example the ignition is activated or that the engine is running.

In order to ensure reliable operation, the gear box is equipped with an arresting device, which holds the locking member in its respective position. The arresting device warrants that the locking member securely remains in the locked position, or in the released position. Any vibrations occurring during the driving operation of the motor vehicle do not cause the locking member to move from its respective position, as the arresting device provides a reliable blocking of this function-essential component.

In a preferable embodiment, the gear box features a lift-producing transfer member, which exerts power on a lever, and which is movably situated between the transfer member and the locking member. The transfer member, which can for example be driven by an electrical motor, is engineered in form of slices in an embodiment variant, wherein the transfer member is situated with the ability to turn around an axis.

Preferably, the lever is engineered with a protruding contact surface, which engages into a spiral-formed connecting member run of the transfer member. When the transfer member is powered, the contact surface of the lever slides along the connecting member run, which causes the lever to swing around the axis. The movement of the lever drives the locking member.

An additional version to improve the invention can provide it with the arresting device featuring a locking element, which runs in a connecting member. It is of advantage that the lever, which transfers the motion from the transfer member to the locking member, is incorporated into the subject connecting member. It is practical that the locking element is aligned on the arresting device in a manner, that the locking element is movable between a first and a second position along the connecting member. While the locking element is located in the first position, the locking member is held securely by the arresting device in the locked position as well as in the released position. During the movement of the locking member between the locked position and the released position, the locking element is situated in the second position.

Thus, per the subject invention, the locking element has two differing functions: on the one hand it is a significant component of the arresting device. On the other hand, the locking element engages with its lobe into the connecting member of the lever, which can achieve the motion transfer from the lever to the locking member, so that a reliable movement of the locking member to its respective position is achieved. In a preferred embodiment, the lever and the locking member are pivotably located about an axis, wherein particularly the lever and locking member can swing around the same axis, which can achieve a compact design of components, which swing towards each other, within the housing of the invention-relevant device.

Furthermore, a position capture unit can be provided, which allows a movement of the locking member into the locking position, only at a defined position of the steering unit of the motor vehicle. The subject invention can reference a steering lock of a motor vehicle, particularly of a motorcycle, in which a transfer of the locking member to a locked position only becomes possible at a defined position of the steering unit. For this purpose, sensor elements or feeler elements can be utilized, which detect the handlebar or the steering unit turn electronically or mechanically.

In a potential embodiment of the invention, the position capture unit mechanically captures the position of the steering unit, wherein the gear box is controllable via a switch depending on the position of the steering unit, with the goal of bringing the locking member into the locked position. It is advantageous that the position capture unit is permanently attached to the frame of the motor vehicle, particularly of the motorcycle, wherein the position capture unit remains immovably in its place in the motor vehicle in spite of a movement of the steering unit.

In the spirit of the invention, it is conceivable that the actuation unit is situated on the steering unit, wherein the position capture unit triggers a corresponding movement of the locking member via the position of the actuation unit, wherein particularly the actuation unit features an activation element, which acts in conjunction with the contour of the position capture unit. It is advantageous that the activation element is movable between the rest position and activation position, wherein in the activation position, a switch triggers a movement of the locking member into the locked position. In this sense, the contour can be engineered with an effective surface, which holds the activation element in its activation position, wherein the surface is engineered as an opening, recess or salient. The switch can adopt the form of a Hall-sensor, optical sensor, touch sensor, etc.

It is advantageous to provide that the invention-relevant device is monitored by control electronics. For technical safety reasons, it is advantageous if aside from the capture of the position of the transfer member, also the position of the lever and locking member is captured. This can, for example, be accomplished with sensors, particularly magnetic field sensors, which capture the magnetic field of e.g. permanent magnets situated on the transfer member, lever, locking element or locking member. In this manner an electronic control can monitor the function of the mechanical coupling between the transfer member and the locking member, in addition to recognizing a manipulation.

The patent-relevant device can be utilized as electrical steering lock for motor vehicles, wherein additionally the device is easily combined particularly with the so-called keyless-entry systems. The patent-relevant device is initiated by an activation of the actuation unit, particularly after a subsequent authentication process. In this sense it is self understood that the invention provides a feedback as to whether the subject device locks or does not lock the function-critical component, particularly the steering column of the motorcycle. This can for example be done with an optical or acoustic feedback device. A potential design form is that this information is visually brought to the attention of the user via the display of the actuation element.

Figure 8:
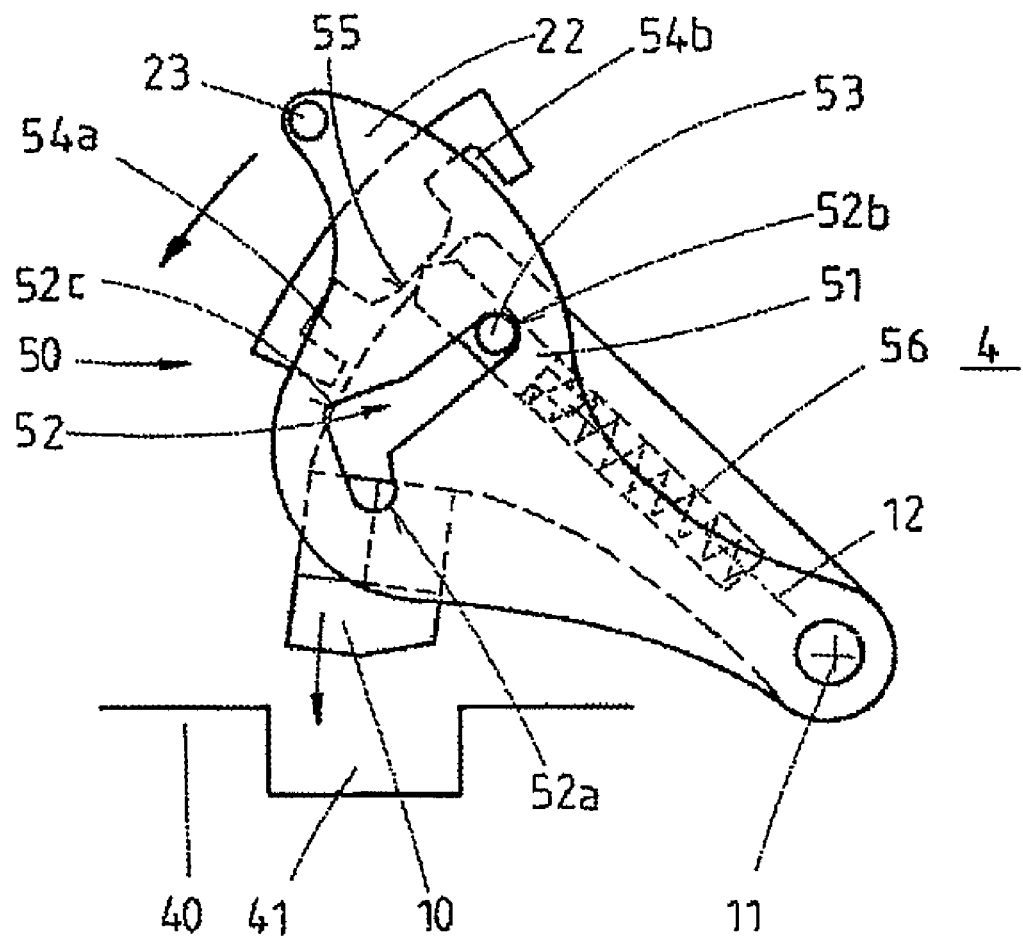
Figure 9:
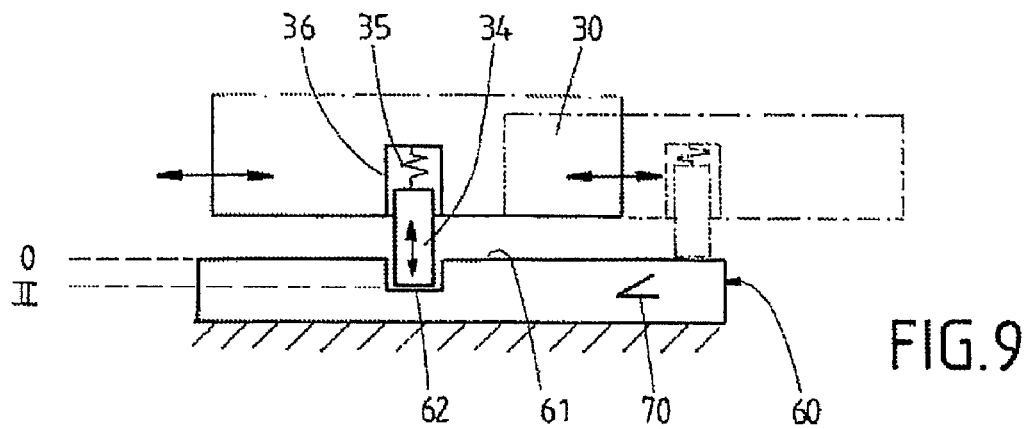
Figure 10:
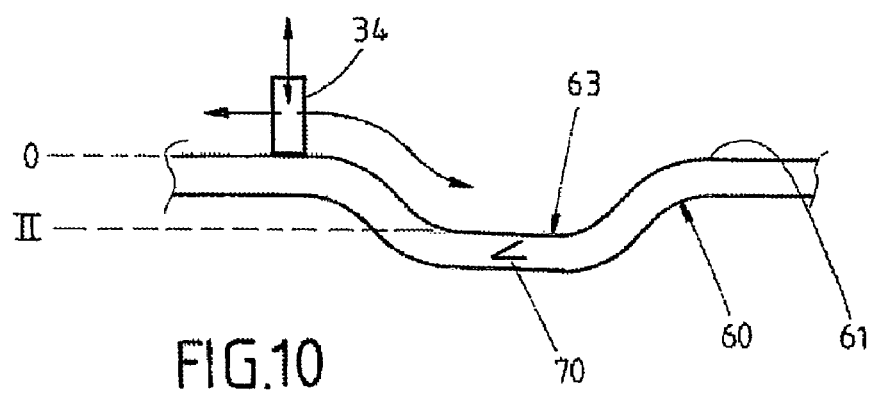
Figure 11:
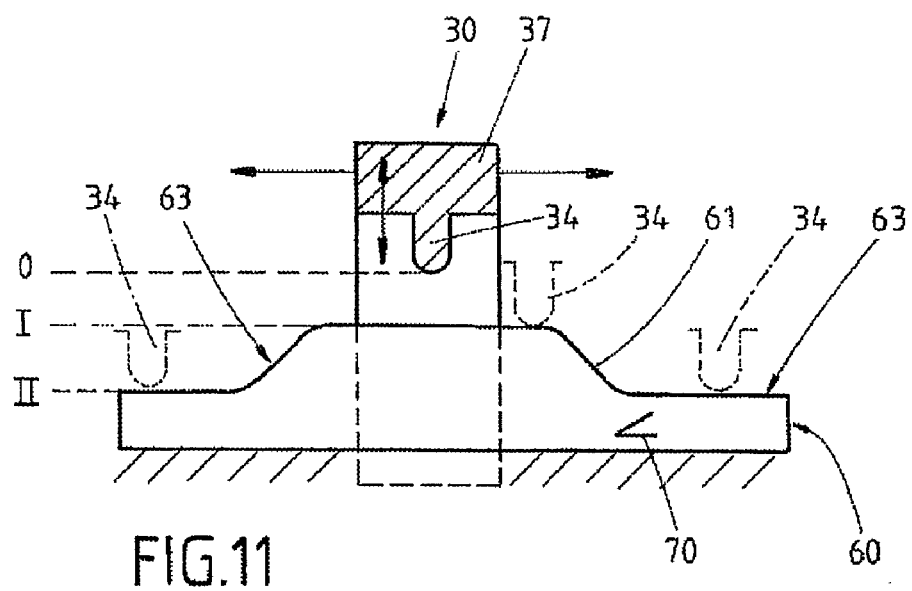

Additional advantages, characteristics and details of the invention can be derived from the following description, in which potential embodiments of the invention are depicted using the references to drawings. In this sense, the characteristics named in the claims and in the description can be invention-relevant as stand-alone features or in any desired combination. The figures show:

FIG. 1 a patent-relevant device to control the locking member of a steering column of a motorcycle with an actuation unit and a gear box, wherein the actuation unit is uncoupled from the gear box, FIG. 2 the device per FIG. 1, wherein the actuation unit is in operative connection with the gear box, FIG. 3 a side view of the device per FIG. 1, FIG. 4 an additional side view of the device per FIG. 1, which encompasses an arresting device, which holds the locking member in the locked position, FIG. 5 the device per FIG. 4, wherein the arresting device is situated in such a location, that the movement of the locking member is enabled, FIG. 6 the device per FIG. 4, wherein the arresting device is moving towards the released position, FIG. 7 the device per FIG. 4, wherein the arresting device is located in the released position and the arresting device is blocking the movement of the locking member, FIG. 8 the device per FIG. 7, wherein the arresting device is situated in such a location, that the movement of the locking member towards the locked position is enabled, FIG. 9 an additional embodiment of the patent-relevant device per FIG. 1, wherein the actuation unit is working in conjunction with a position capture unit, FIG. 10 and additional design option of the position capture unit, which is working in conjunction with the actuation unit, and FIG. 11 and additional design alternative of an actuation unit, which is working in conjunction with a position capture unit.

The embodiment examples per FIGS. 1 through 11 present in a schematic manner possible embodiment forms of a device to control the locking member 10 of a function-critical component 40. Component 40 comprises a steering column 40 of a motorcycle. The device features a gear box 20, which is mechanically coupled to the locking member 10. FIGS. 3 and 4 represent the locking member 10 in a locked position 1. The locking member 10 is movable via the gear box 20 from the locked position 1 to the released position 2, which is depicted in FIG. 7. In the locked position 1, the locking member 10 protrudes with its free end into a groove 41 of the steering column 40, which causes the steering column 40 to be locked. In contrast, the locking member 10 is detached from the steering column 40 in the released position 2.

The gear box 20 features a transfer member 21, which in engineered as drive wheel and is situated rotatably on an axis 24. The transfer member 21 is driven by an electronic motor 25, which is depicted in FIG. 1 and FIG. 2. The electronic motor 25 features a pinion gear, which engages into a cogging area 26 of the transfer member 21. The turning axis 24 of the transfer member 21 and the undepicted turning axis of the pinion gear, are situated parallel to each other, which produces spur-gear cogging between the cogging area 26 of the transfer member 21 and the pinion gear of the electric motor 25.

As FIG. 1 and FIG. 2 depict, an actuation unit 30 is provided and accessible to the user, and it maintains a signal connection with the gear box 20 during normal operation. The gear box 20 is controlled electronically via an intentional activation of the actuation unit 30, which brings the locking member 10 into its respective position 1, 2; which is explained in the following part in FIG. 4 through FIG. 8. As depicted in FIG. 1, the actuation unit 30 is mechanically uncoupled from gear box 20. In the event of emergency operation, when electronic supply is not provided to relevant components, the actuation unit 30 can be coupled to the gear box 20 mechanically, by inserting an emergency key 33 into a receptor body 32, particularly a key cylinder of the actuation unit 30 (refer to FIG. 2). The receptor body 32 is covered by an actuation element 31, which can be seen in FIG. 1. First, this actuation element 31 must be removed, swung open, or moved away from the receptor body 32 by alternative means, before the emergency key 33 is inserted into the receptor body 32.

The actuation unit 30 is shown in a rest position 5 in FIG. 1. In this rest position 5, the actuation unit 30 is found in a disconnected state from gear box 20. FIG. 2 depicts the actuation unit 30 in an actuation position 6, in which the actuation unit 30 is found in an operative connection with the gear box 20. As the emergency key 33 is inserted into the receptor body 32, a translational movement of the receptor body 32 towards the transfer member 21 occurs. A form-locking connection exists between both components 30, 21 in the actuation position 6 of the actuation unit 30. A flow of motion into the gear box 20 occurs via a subsequent turn of the emergency key 33 around the axis 24, which in end effect causes a corresponding movement of the locking member 10 via the lever 22.

The free end of the receptor body 32 protrudes per FIG. 1 as well as per FIG. 2 into a bushing 27 situated on the transfer member 21. The interior area of the bushing 27 as well as the free end of the transfer member 21 are geometrically designed in a way that the actuation unit 30 and the transfer member 21 form-fit each other in the actuation position 6, so that a manual turning movement of the emergency key 33 can achieve a reliable activation of the gear box 20.

Per FIG. 3, the gear box 20 features a lift-producing transfer member 21, which acts on the lever 22, and which is movably situated between the transfer member 21 and the locking member 10. In addition, the gear box 20 features an arresting device 50, which can reliably hold the locking member 10 in its respective position 1, 2. The arresting device 50 features a locking element 51, which is situated in the connecting member 52 of the lever 22. A lobe 53 of the locking element 51, depicted in FIG. 4 through FIG. 8, engages into connecting member 52. The locking element 51 is situated on the arresting device 50 in such a way that the locking element 51 is movable along the connecting member 52, between a first position 3 and a second position 4. In the locked position 1, which is depicted in FIG. 3 and FIG. 4, and in the unlocked position 2, which is depicted in FIG. 7, the arresting device 50 securely holds the locking member 10, while the locking element 51 is situated in the first extended position 3. In the first position 3, the locking element 51 extends into a first receptor opening 54a, which is firmly situated on the housing of the invention-relevant device.

The locking element 51 is movably arranged on the locking member 10, wherein it is spring-loaded and situated on locking member 10. The locking element 51 is linearly shiftable along an axis 12, and shiftable from the first position 3 to the second position 4 and vice-versa. Per FIG. 3, the transfer member 21 features a spiral-formed connecting member run 21a, into which the lever 22 engages with its protruding contact surface 23. The lever 22 and the locking member 10 are thus situated on a joint axis 11 with ability to turn. The connecting member run 21a is arranged on the side of the transfer member 21, which faces away from the receptor body 32.

Thus, in order to move the locking member 10 from its locked position 1 towards the released position 2, a turn of the transfer member 21 around its turning axis 24 is carried out. In relation to the embodiment example, the transfer member 21 per FIG. 3 rotates clockwise around the axis 24. This has the effect that the contact surface 23 is swung along the connecting member run 21a, counterclockwise around the axis 11. The turning movement of the transfer member 21 can be carried out via the activation of the actuation element 30 in normal operation, as well as via a manual actuation of the actuation element 30 in emergency operation.

While the lever 22 per FIG. 3 is swung counter clockwise around the axis 11, which per FIGS. 4 through 7, corresponds to the movement of the lever 22 clockwise around the axis 11, motion transfer takes effect to the locking member 10, which exits the locked position 1 per FIG. 3 and FIG. 4 and reaches the released position 2 per FIG. 7. While the lever 22 based on FIG. 4 swings clockwise around the turning axis 11, the connecting member 52 of the lever 22 exerts its power on the lobe 53 of the locking element 51, which causes the locking element 51 to move towards the axis 11 linearly within the locking member 10. This then causes the locking element 51 to exit the first receptor opening 54a. Furthermore, the connecting member 52 features a first 52a, a second contact surface 52b, as well as an arresting surface 52c. Based on the position of the lobe 53 per FIG. 4, which abuts the arresting surface 52c of the connecting member 52, the lobe 53 moves towards the first contact surface 52a. As long as the lobe 53 has not reached the first contact surface 52a of the lever 22, only a linear shift of the locking element 51 along the axis 12 takes place, without the locking member 10 being moved out of its locked position 1. It is only when the lobe 53 per FIG. 6 abuts the first contact surface 52a of the connecting member 52 and the lever 22, via the transfer member 21, continues to swing around the axis 11, then the motion transfer onto locking member 10 occurs, which joins the swinging movement from the locked position 1 towards the released position 2 around the axis 11.

From a certain turning angle of the lever 22 on, the locking element 51 reaches the second receptor opening 54b, which element is depicted in FIG. 7. When this turn position of the lever 22 is reached, a spring, situated within the locking member 10, presses the locking element 51 into the second receptor opening 54b, wherein, simultaneously, the lobe 53 of the locking element 51 within the connecting member 52, is pressed towards the arresting surface 52c and remains there. A counter bearing 55 is situated between the first 54a and the second receptor opening 54b, against which the locking element 51 slides along with its free end, during its movement from the first 54a to the second receptor opening 54b and vice-versa.

Starting from the released position, which is depicted in schematic manner in FIG. 7, the locking process is carried out in the way, that via an opposite turn of the transfer member 21, meaning in counter clockwise direction, per FIG. 3, the lever 22 with its contact surface 23, is guided along the transfer member run 21a. Based on FIG. 7, it means that the lever 22 swings counter clockwise around the turning axis 11, while, simultaneously, the lobe 53 of the locking element 51 is pushed from the connecting member 52 of the lever 22, from the arresting surface 52c, towards axis 11. Simultaneously, the lobe 53 moves towards the second contact surface 52b of the connecting member 52, until the lobe 53 actually abuts the second contact surface 52b.

During this movement, the locking member 10 remains unchanged in its released position 2. However, at the same time, the locking element 51 exits the second receptor opening 54b. Should the locking element 51 no longer be engaged to the second receptor opening 54b, the second position 4 of the locking element 51 is reached, in which the side of the locking element 51 facing away from the axis 11 comes in contact with the counter bearing 55. It is only upon contact of the lobe 53 with the second contact surface 52b that motion transfer if effected via the corresponding counter clockwise movement of the lever 22 around the axis 11, to the locking member 10, which moves from the released position 2 towards the locked position 1, which is explained in FIG. 8. When the appropriate turning angle of the lever 22 is reached, the locking element 51 is pressed by the spring 56 acting from within the locking member 10, into the first receptor opening 54a, so that the locked status per FIG. 4 is reached.

As is explained in FIGS. 4 through 8, the locking element 51, particularly the lobe 53 during the movement of the locking member 10 into its respective position 1, 2, carries out a pendulum movement relative to the lever 22, within the connecting member 52. It means that the lobe 53 runs from the locked position 1 to the released position 2, first from the arresting surface 52c to the first contact surface 52a and subsequently returns to the arresting surface 52c. By contrast, the lobe 53 shuttles from the released position 2 to the locked position 1 starting from the arresting surface 52c, first towards the second contact surface 52b, before the lobe 53 is again guided back to the arresting surface 52c. This specific kinematics warrants a reliable function process while controlling the locking member 10, whereby, at the same time, a very compact arrangement of the gear box 20 is attained. The relevant elements of the arresting device 50, particularly the locking element 51, in addition to the contour of the connecting member 52, serve simultaneously as necessary components of the gear box 20, with the goal of attaining a sufficient motion transfer from the transfer member 21, via the lever 22, to the locking member 10. In addition to the actual arresting function of the locking element 51, the locking element 51 simultaneously comprises a significant component of the gear box 20, with the goal of bringing the locking member 10 into its respective position.

FIGS. 9 through 11 depict possible position capture units 60, which, only at a defined position of the steering unit of the motorcycle, permit a movement of the locking member into the locked position, per FIGS. 1 through 8. FIG. 9 depicts the actuation unit 30, which is connected to the steering unit, wherein a movement of the actuation unit 30 can be carried out simultaneously via a movement of the steering unit, per double arrow shown. The position capture unit 60 is permanently attached to the frame of the motorcycle. In this context, the position capture unit 60 is designed with a contour 61, which features an opening 62. A pin-type activation element is situated on the actuation unit 30, which is located in a groove 36 within the actuation unit 30 and which is spring-loaded by the spring 35.

The activation element 34 can be moved between a rest position 0 and an activation position II. The position 0, II of the activation element 34 depends on the position of the steering unit as well as the actuation unit 30. FIG. 9 depicts the rest position 0 of the activation element 4, in which the activation element 34 rests on the contour 61 of the position capture unit 60. If the steering unit is swung around in order to trigger the lock of locking member 10 per FIGS. 1 through 9, in a defined position of the steering unit, the activation element 34 first moves along the contour 61 of the position capture unit 60. When the steering unit and the actuation unit 30 reach a defined position, the activation element 34 per FIG. 9 enters into the opening 62 of the position capture unit 60. When the activation element 34 reaches its activation position II, it is recognized by a switch 70, which subsequently drives the gear box 20 electronically, per FIG. 1 through FIG. 8, to move the locking member 10 to the locked position 1.

FIG. 10 depicts an additional variant of the position capture unit 60 per FIG. 9, wherein the activation element 34 is situated in its rest position 0. In this situation, the activation element 34 is movably situated in the actuation unit, which is not explicitly depicted. The contour 61 of the position capture unit 60 is designed with a salient 63. When the steering unit and the actuation unit are moved or swung by the user into a respective position, the activation element 34, as already shown in FIG. 9, moves along the contour 61 of the position capture unit 60. When the activation element 34 reaches the salient 63, the activation element 34 is situated in its activation position II, in which, as already shown in FIG. 9, the gear box 20 is driven by a switch 30 to move the locking member 10 into the locked position 1.

FIG. 10 depicts the activation element 34 protruding towards the position capture unit 60. In this Figure, the actuation unit 30 features a cap 37, which can be actuated by the user, wherein in the event of actuation, the cap 37 is movable at the immovable basic body of the actuation unit 30, per the double arrow. As it is shown here, the cap 37 is incorporated into the activation element 34. In order for the user to effect the lock of the locking member per FIG. 1 through FIG. 8, the user, according to FIG. 11 in addition to FIG. 9 and FIG. 10, first presses the actuation unit 30, which is thus moved towards the position capture unit 60. Should the steering unit not be positioned in its respective turned position, in order to trigger the lock of the locking member, the activation element 34, per FIG. 9 through FIG. 11, does not reach the effective area 62, 63, as suggested in FIG. 9, that the activation element 34 does not move into the opening 62, per FIG. 11, the activation element 34 does not enter the salient 63, and per FIG. 10, the activation element 34 solely reaches the interim position I, where it touches the contour 61 outside the salient 63, with its free end.

Returning to FIG. 10, the activation element 34 reaches its activation position II, in the event when a defined, turned position of the steering unit is reached. Also in FIG. 10, a switch 70 ensures that when the activation position II of the activation element 34 is reached, the gear box 20 is driven to move the locking member 10 into the locked position 1. It is for example conceivable that at reaching the interim position I of the activation element 34, the ignition of the motor vehicle, in this case motorcycle, is initiated. A corresponding interim position I per FIGS. 9 and 10 is also conceivable. In addition, the placement of switch 70 per FIG. 9 through FIG. 11 is depicted solely in a schematic fashion. The exact placement of the switch 70 can for instance be at the position capture unit 60, which is lastingly situated on the motor vehicle. It is also conceivable that the switch is situated on the actuation unit 30 or on adjacent components. The switch can for example be a Hall-sensor. All of the embodiments provide two effective areas 62, 63 at a distance from one another, so that the user can effect a lock of the steering column 40, whether he turns the steering unit to the right or to the left.

LIST OF REFERENCE CHARACTERS

1 Locked position
2 Released position
3 First position
4 Second position
5 Resting position
6 Actuation position
10 Locking member
11 Axis
12 Axis
20 Gear box
21 Transfer member
21*a* Connecting member run
22 Lever
23 Contact surface
24 Axis
25 Electrical motor
26 Cogging area
27 Bushing
30 Actuation unit
31 Actuation element
32 Receptor body
33 Emergency key
34 Activation element
35 Spring
36 Groove
37 Cap
40 Function-essential component
41 Groove
50 Arresting device
51 Locking element
52 Connecting member
52*a* First contact surface
52*b* Second contact surface
52*c* Arresting surface
53 Lobe
54*a* First receptor opening
54*b* Second receptor opening
55 Counter bearing
56 Spring
60 Position capture unit
61 Contour
62 Opening
63 Salient
70 Switch
0 Rest position
I Interim position
II Activation position

The invention claimed is:

1. A device for actuating a locking member of a functionally essential component, particularly a steering column of a motor vehicle, comprising:
   a gear box, being operatively connected to the locking member, wherein the locking member can be moved into a locked position and into a released position, and vice versa, wherein
   the locking member engages into the functionally essential component in the locked position,
   the locking member is released from the functionally essential component in the released position,
   an actuation device is provided that can be accessed by a user, said actuation device being signal-connected to the gear box during normal operation, by means of which an electronic actuation of the gear box can be effected via an intentional actuation of the actuation device, said gear box moving the locking member into the locked or released position,
   wherein the actuation device is mechanically uncoupled from the gear box during normal operation, and that the actuation device can be mechanically coupled to the gear box during emergency operation, such that a movement of the locking member into the locked or released position thereof, is carried out via manual actuation of the actuation device.

2. The device according to claim 1,
   wherein the gear box further comprises an arresting device, which holds the locking member in the locked or released position.

3. The device according to claim 1,
   wherein the gear box further comprises a lift-producing transfer member, which exerts motion on a lever, which is movably situated between the transfer member and the locking member.

4. The device according to claim 1,
   wherein the arresting device further comprises a locking element, which is guided in a connecting member.

5. The device according to claim 4,
   wherein the locking element is situated on the arresting device in a way, that the locking element is movable along the connecting member, between a first position and a second position,
   wherein, in the locked position and in the released position, the arresting device securely holds the locking member, while the locking element is situated in the first position, and the locking element is situated in the second position during the movement of the locking member between the locked position and the released position.

6. The device according to claim 4,
   wherein a lever is configured with the connecting member, into which a lobe of the locking element engages.

7. The device according to claim 3,
   wherein the lever and the locking member are movably situated around an axis, wherein particularly the lever and the locking member can be swung around the axis.

8. The device according to claim 3,
wherein the lever is configured with a protruding contact surface, which engages into a spiral-formed connecting member run of the transfer member, turnable around an axis.

9. The device according to claim 8,
wherein the connecting member further comprises a first and a second contact surface in addition to an arresting surface,
wherein a lobe abuts the arresting surface in the locked position and in the released position of the locking member,
the lobe abuts the first contact surface during the movement of the locking member from the locked position to the released position,
the lobe abuts the second contact surface during the movement of the locking member from the released position to the locked position.

10. The device according to claim 4,
wherein, during the movement of the locking member to the locked or released position, the locking element carries out a pendulum movement relative to a lever, within the connecting member.

11. The device according to claim 4,
wherein the locking element is movably situated on the locking member.

12. The device according to claim 1,
wherein the actuation device further comprises an actuation element and a receptor body, into which an emergency key can be inserted in the event of emergency operation.

13. The device according to claim 1,
wherein the actuation device is able to move between a rest position and an actuation position, wherein the actuation device is situated disengaged from the gear box in the rest position, and the actuation device finds itself in an operative connection with the gear box in the actuation position.

14. The device according to claim 12,
wherein the actuation element further comprises a proximity sensor or a touch sensor.

15. The device according to claim 12,
wherein, during the normal operation, the actuation element shields the receptor body, particularly that the actuation element features a display medium, which serves to provide information.

* * * * *